UNITED STATES PATENT OFFICE.

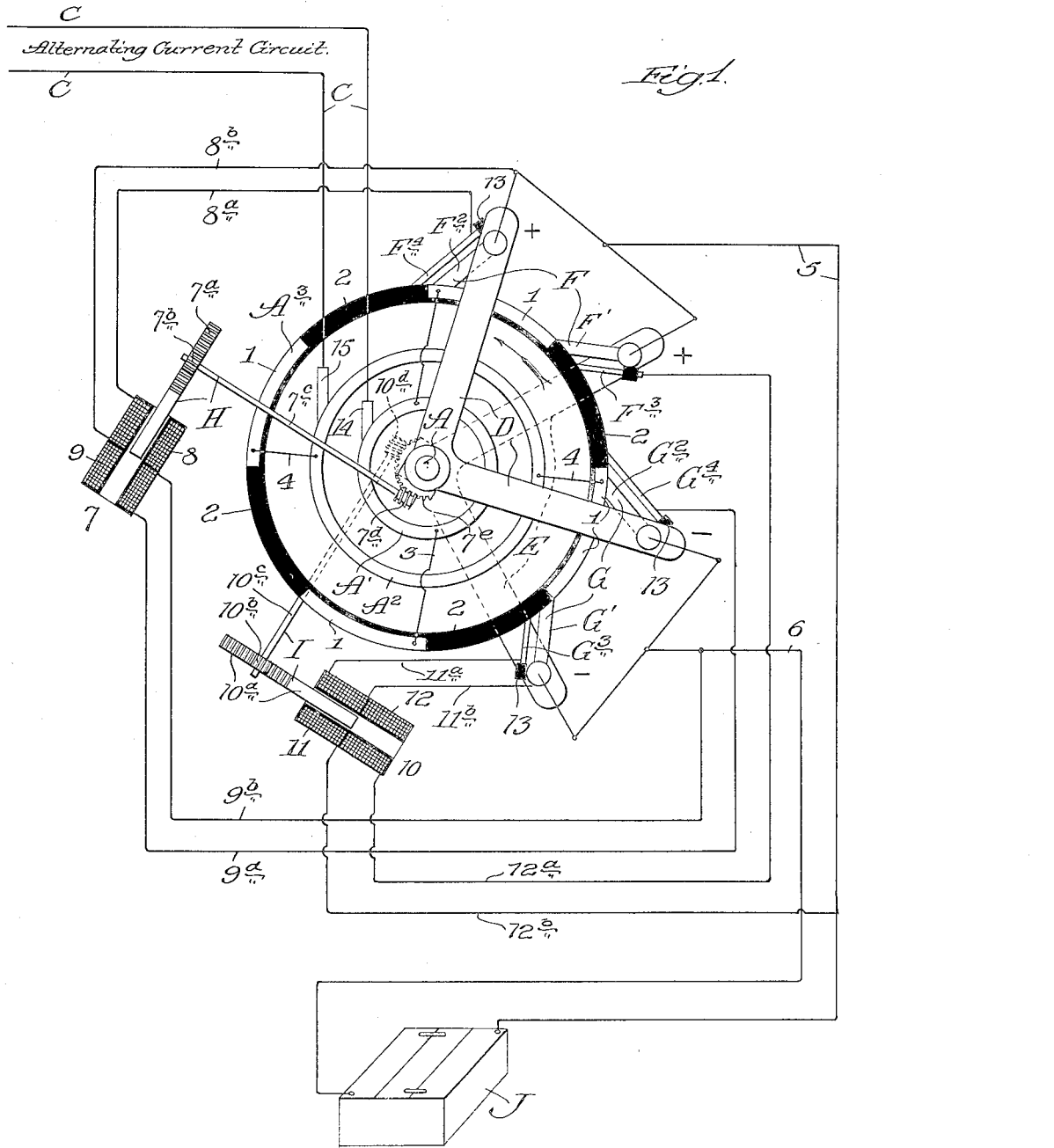

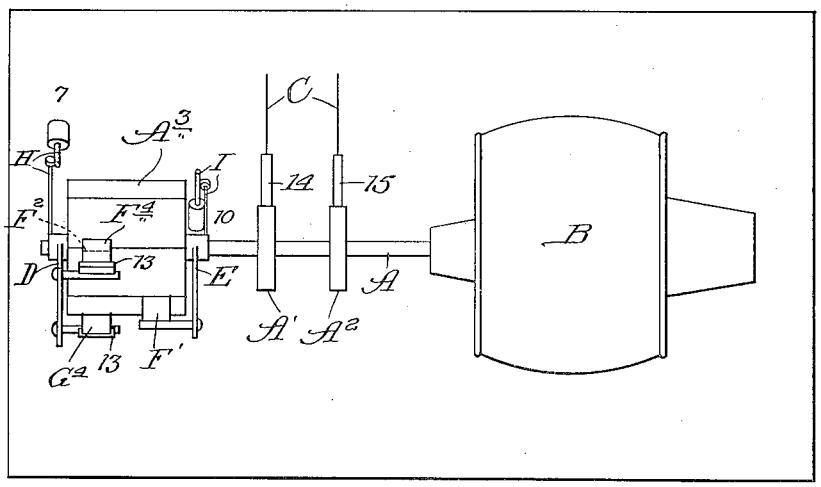

RUSSELL T. WALKER, OF CHICAGO, ILLINOIS.

RECTIFIER.

1,407,363.

Specification of Letters Patent.  Patented Feb. 21, 1922.

Application filed June 28, 1920. Serial No. 392,405.

*To all whom it may concern:*

Be it known that I, RUSSELL T. WALKER, a citizen of the United States, residing at Chicago, in the county of Cook and State of Illinois, have invented a new and useful Improvement in Rectifiers, of which the following is a specification.

This invention relates particularly to current rectifying apparatus of the rotary type; and the primary object is to provide an improved rectifier, possessing high efficiency. The improved device is particularly adapted to the purpose of rectifying single-phase alternating current.

The invention is illustrated, in its preferred embodiment, in the accompanying drawings, in which—

Fig. 1 represents an end elevational view of the improved rectifier, or rotary converter, the view being diagrammatic in its nature; Fig. 2, a plan view of the improved rectifier; Fig. 3, a diagram illustrating pressure curves, such as may exist during the charging of a storage battery; and Fig. 4, a diagram illustrating pressure curves, such as may exist during the operation of a motor supplied with rectified current.

It may be stated here that the improved rectifying apparatus employs, in the form illustrated, a variable-span pair of positive brushes which constitute, in effect, an expansible or variable-span positive brush, and a variable-span pair of negative brushes which constitute, in effect, an expansible or variable-span negative brush; and these brushes co-operate with a commutator provided with conducting segments which alternate with non-conducting segments, the segments being such that the period of one conducting and one insulating segment shall be equal to the period of one-half the cycle of the alternating current which the apparatus is designed to translate into direct current. In the illustration given, one member of the expansible positive brush and one member of the expansible negative brush are mounted upon a movable carrier, while the other member of the expansible positive brush and the other member of the expansible negative brush are mounted upon another and independently movable carrier. These carriers are automatically adjusted to vary the positions of the brushes to correspond with a change of the neutral point, so that the circuit will be open during such period as the forward pressure delivered by the rectifier is less than the back pressure from the battery or device to which the rectified current is being delivered. Thus, the circuit will be opened when the decreasing forward voltage delivered by the rectifier becomes equal to the back voltage, and the circuit will be closed when the increasing forward voltage has again become equal to the back pressure. It may be stated, also, that in the improved apparatus, the brushes will be automatically moved towards the neutral point when the circuit is opened too soon, or too late. It may be explained that the brushes are said to be on the neutral point when the circuit is opened or closed at the instant the resultant voltage is zero, that is, when the forward voltage is equal to the back voltage.

In the construction illustrated, A represents a shaft driven at continuous speed by means of a motor B, synchronized to correspond with the alternating current supplied by a circuit C; A' and A², a pair of rings insulatingly mounted on the shaft A to rotate therewith; A³, a commutator mounted on and rotating with the shaft A; D, an oscillating carrier mounted on the shaft A and at one side of the commutator; E, a similar carrier mounted on said shaft at the other side of the commutator; F, an expansible or variable-span pair or set of positive brushes, comprising an advance brush F' mounted on one arm of the carrier E and a brush F² mounted on the corresponding arm of the carrier D, the brush F' serving as a circuit-closing brush and the brush F² serving as a circuit-opening brush; G, an expansible or variable-span pair or set of negative brushes comprising an advance brush G' mounted on the advance arm of the carrier E and a follower brush G² mounted on the advance arm of the carrier D, the brush G' serving as a circuit-closing brush and the brush G² serving as a circuit-opening brush; F³ and F⁴, feeler-brushes or carrier-controlling brushes associated, respectively, with the positive brushes F' and F², G³ and G⁴ feeler-brushes associated, respectively, with the negative brushes G' and G²; H, mechanism for automatically moving the carrier D; I, mechanism for automatically moving the carrier E; and J, a storage battery being charged with current from the rectifier.

The commutator is composed of conducting segments 1 and "dead" or insulation segments 2, alternating with the conducting segments. The combined width of a conducting segment and insulation segment, constituting a pair, should correspond with or have a period equal to the period of one-half the cycle of the alternating current; and it is preferred that the conducting segments and insulation segments shall be of the same width. In any event, the relative widths of the conducting segments and insulation segments should be such that it will be possible to leave the circuit open during any period when the back voltage exceeds the forward voltage. It should be borne in mind that in charging the battery, for example, the back voltage will constantly increase as the charging operation continues; hence, it is necessary that the brushes be automatically moved as the neutral point changes. In the beginning of the operation of charging the storage battery, the two members of each of the positive and negative expansible brushes will be separated as widely as the apparatus will permit, so that the circuit will be practically closed all the time during the early portion of the charging operation. As the charging continues and the back pressure rises, the members of each of the expansible positive brush and the expansible negative brush will be automatically moved towards each other, so that during such portion of the cycle as the forward pressure falls below the back pressure, the members of each of said expansible brushes will be on an insulation segment, thus interrupting the circuit, so that there can be no backward flow of current.

In the illustration given, two of the diametrically opposite conducting segments 1 are connected, by wires 3, with the ring $A'$ of the alternating circuit; and the other two diametrically opposite conducting segments are connected, by wires 4, with the ring $A^2$ of the alternating circuit.

The positive brushes are connected, by a conductor 5, with one terminal of the battery J; and the negative brushes are connected, by a wire 6, with the other terminal of the battery.

The mechanism H, which serves to oscillate the brush-carrier D, comprises, in the form shown, a solenoid 7 which actuates a rack $7^a$ with which meshes a pinion $7^b$ of a shaft $7^c$ equipped with a worm $7^d$ meshing with a gear segment $7^e$ on the hub of the carrier D. The solenoid has two coils 8 and 9 adapted to act with cumulative effect. The coil 8 is connected on one side, by a wire $8^a$, with the positive feeler-brush $F^4$ and on the other side, by a wire $8^b$, with the battery circuit; and the coil 9 is connected, by a wire $9^a$, with the feeler-brush $G^4$, by a wire $9^b$, with the battery circuit. The rack $7^a$, or solenoid-core, is a permanent magnet.

The mechanism I, in the form illustrated, is of the same construction. It comprises a solenoid 10 which actuates a rack $10^a$ engaged by a pinion $10^b$ on a shaft $10^c$, whose inner end is equipped with a worm $10^d$ which engages a gear segment with which the carrier E is equipped at its hub portion. The solenoid 10 has windings 11 and 12 adapted to act with cumulative effect. The winding 11 is connected, by a wire $11^a$, with the negative feeler-brush $G^3$, and by a wire $11^b$, with the negative side of the battery circuit. The winding 12 is connected, by a wire $12^a$, with the feeler-brush $F^3$, and by a wire $12^b$ with the positive side of the battery circuit, that is, the positive line leading to the battery. The rack $10^a$, or solenoid core, is a permanent magnet.

The feeler-brushes are mounted on insulation blocks 13 carried by the main brush-holders, so that the feeler-brushes are insulated from the main brush.

The brushes of the alternating current circuit C are designated 14 and 15. As will be understood by those skilled in the art, the shaft A is rotated by the motor B at the proper speed to correspond with the alternations of the current delivered by the circuit C, so that the conducting segments of the commutator will have a positive charge while passing under the positive brushes, and will have a negative charge while passing under the negative brushes. The position of the brushes shown in Fig. 1 corresponds with the beginning of the operation of charging the battery, the positive brushes $F'$ and $F^2$, constituting expanding and contracting brushes, being at about the point of their widest separation. Similarly, the expanding negative brush is in the expanded position. Thus, the positive brush $F'$ has been collecting positive electricity, while the segment 1 was in contact therewith, and the brush $F^2$ will continue this collection until the segment 1 passes from beneath it. In the same manner, the brushes $G'$ and $G^2$ are collecting negative electricity practically continuously. As the back pressure from the battery increases, the carrier D will be turned clockwise, while the carrier E will be turned anti-clockwise, thus causing the positive brushes to approach, and causing the negative brushes to approach. In other words, the positive brush, which comprises a pair of brushes, contracts as the back pressure mounts, and the negative brush, which comprises a pair of brushes, contracts as the back pressure mounts. Thus, both members of each pair of brushes will, at intervals, be riding on an insulation segment, thus interrupting the circuit; and the period of interruption grows larger and larger as the back pressure continues to rise.

This may be illustrated by reference to Figs. 3 and 4, in which the base-line is designated 16, 16; the back pressure-line is designated 17, 17, and the rectified current pressure-lines are designated 18. The neutral points are designated 19; and the neutral points constantly rise in position as the back pressure increases, so that it will be seen that the space between the curves 18 increases as the back pressure rises.

The automatic adjustment of the brushes may be indicated as follows: Assume that by reason of the increasing back voltage, the circuit is closing too soon, then it will be understood that as a conducting segment approaches the leading positive brush it will make contact with the feeler-brush $F^3$, and the back voltage being in excess at the instant, a negative current flows from the feeler-brush $F^3$ to the winding 12 of the solenoid 10, thence to the line 5, thence through the storage battery and back by the line 6 to the negative leading or closing brush $G'$, then to the winding 11 of the solenoid 10, and thence to the feeler-brush $G^3$, thus completing the circuit. The follower, or opening brushes, are on the insulation segments at this instant, and, consequently, no current can flow in that part of the mechanism. Under the conditions stated, the solenoid 10 will move the carrier E counter-clockwise, thus shortening the span of the pairs of brushes and properly regulating the length of the period of interruption of the circuit.

Should the circuit close too late, the forward voltage would be in excess, and the current would flow in the same path, but in the opposite direction. This would cause the brush-holder to be moved in a clockwise direction to the neutral point. In a similar manner, the mechanism H keeps the follower or opening brushes $G^2$ and $F^2$ in the neutral position.

In operating a direct current motor on rectified alternating current, there are three different pressures or voltages to be considered, viz.: the forward pressure from the generator; the back pressure or electro-motive force of the motor; and the electromotive force due to induction. The pressure of the induction current is indicated in Fig. 4 by the lines 20. When closing the circuit, the pressure due to induction is in the same direction as the back pressure. Thus, when closing the circuit, the inductive pressure adds to the back pressure and opposes the forward pressure. To meet this condition, the advance, or closing brushes will move counter-clockwise automatically so as to close the circuit when the back pressure plus the induction pressure is exactly equal to the forward pressure, that is, when the resultant pressure is zero. When opening the circuit, the induction pressure is in the same direction as the forward pressure. Hence, the follower, or opening brushes must be moved forward so that they open the circuit when the forward pressure plus the induction pressure equals the back pressure. This is accomplished by the mechanism.

It may be stated that the improved apparatus provides a highly efficient rectifier; and thus the apparatus may be advantageously used for the usual purpose of charging storage batteries. The apparatus may be also advantageously used for operating street railway cars, or the like, where alternating current is supplied to the lines and the voltage is reduced by means of a suitable transformer and then conducted to the rectifier. This enables the alternating current to be transmitted through the lines at high pressure in the most economical manner; and the rectifying operation can be efficiently accomplished at the point where the service is required.

It is to be noted that if, at the end of the operation of charging the battery, the advance and lagging members of each variable-span brush are brought into the same plane, or into close angular relation, said members will be automatically separated to increase the span when the rectifying apparatus is again employed to charge the battery. A commutator-engaging member of each variable-span brush is preferably mounted on each one of the movable carriers employed; and these movable carriers are preferably segmental spiders capable of oscillating about the axis of the commutator. It is noted that in the arrangement shown a feeler-brush is mounted in advance of the advance or closing member of each variable-span brush, and another feeler-brush is mounted in the rear of the lagging, or circuit-breaking, member of each variable-span brush.

The foregoing detailed description has been given for clearness of understanding only and no unnecessary limitation should be understood therefrom, but the appended claims should be construed as broadly as permissible, in view of the prior art.

What I regard as new, and desire to secure by Letters Patent, is—

1. In a rectifier, the combination of a commutator provided with alternate conducting and insulating segments of such width that the period of a conducting segment and insulating segment corresponds substantially with the period of one half cycle of the alternating current, means for energizing each conducting segment alternately positively and negatively, a variable-span pair of positive brushes and a variable-span pair of negative brushes, and means for automatically adjusting the members of the variable-span pairs of brushes to vary their span and thus vary the collecting periods to correspond with a change of the neutral pressure point in the system.

2. In a rectifier, the combination of a driven shaft equipped with rings, an alternating circuit having brushes engaging said rings, a commutator mounted on said shaft and provided with alternate conducting and insulation segments, said conducting segments being electrically connected in alternation with said rings, variable-span sets of positive and negative brushes engaging said commutator, and electro-magnetic devices for regulating the spans of said sets of brushes and having circuits provided with controlling brushes engaging said commutator.

3. In a rectifier, the combination of a commutator provided with conducting and insulation segments arranged in alternation, the period of a conducting segment and an adjacent insulation segment corresponding substantially with a half cycle of the alternating current, means for energizing said conducting segments alternately positively and negatively, variable-span pairs of positive and negative brushes engaging said commutator, and electro-magnetic devices serving to vary the spans of said pairs of brushes and having circuits provided with controlling-brushes engaging said commutator.

4. In a rectifier, the combination of a commutator, provided with alternate conducting and insulation segments, the period of a conducting and an insulating segment corresponding with a half cycle of the alternating current to be rectified, means for energizing said conducting segments alternately positively and negatively, brushes coacting with said commutator, a circuit for the rectified current, and automatically operating brush-adjusting means serving to adjust the brushes to open and close said circuit at the instant when the forward and back pressure neutralize each other.

5. In a rectifier, the combination of a commutator, provided with spaced conducting segments, means for energizing said segments alternately positively and negatively, variable-span pairs of brushes engaging the commutator, and automatic brush-adjusting means serving to move said brushes in such manner as to interrupt the rectified current circuit at the instant the decreasing forward pressure is neutralized by the back pressure and to re-establish said circuit at the instant the increasing forward pressure neutralizes the back pressure.

6. In a rectifier, the combination of a commutator, a plurality of brush-carriers, a variable-span pair of positive brushes comprising a member mounted on each of said carriers, a variable-span pair of negative brushes comprising a member mounted on each of said carriers, and independent carrier-adjusting devices and electro-magnetic actuating means therefor having circuits adapted to supply currents thereto in such manner as to vary the positions of said carriers and through the medium thereof adjust said brushes to open and close the rectified current circuit in accordance with the change of the neutral pressure points in said rectified current circuit.

7. In a rectifier, the combination of a commutator, a plurality of carriers, variable-span pairs of positive and negative brushes, each pair having a member mounted on each carrier, carrier-adjusting mechanism, and electro-magnetic actuating means therefor having circuits equipped with controlling-brushes disposed in advance and rear of the members of each variable-span pair of brushes.

8. In a rectifier, the combination of a commutator, a plurality of carriers, variable-span pairs of positive and negative brushes, each pair having a member mounted on each carrier, carrier-adjusting mechanism, and electro-magnetic actuating means therefor having circuits equipped with controlling-brushes disposed in advance and rear of the members of each pair of variable-span brushes, the coils of said electro-magnetic actuating means being connected on one side with said controlling-brushes and on the other side with the rectified current circuit.

9. In a rectifier, the combination of a commutator, a plurality of carriers mounted to oscillate about the axis of the commutator, variable-span sets of positive and negative brushes, each set having a member mounted on each carrier, a controlling-brush in advance of each advance member of each variable-span set of brushes, a controlling-brush in the rear of each lagging member of each variable-span set of brushes, a solenoid having cumulatively acting coils connected on one side with the controlling-brushes associated with the advance members of each variable-span set of brushes and on the other side with the circuit of the rectified current, a solenoid having cumulatively acting coils connected on one side with the controlling-brushes associated with the lagging members of the variable-span sets of brushes and on the other side with the circuit of the rectified current, and carrier-actuating mechanism controlled by said solenoids.

10. In a rectifier, the combination of a commutator comprising alternate conducting and insulation segments, the period of a conducting and insulation segment corresponding with the period of a half cycle of the alternating current to be rectified, a plurality of carriers mounted to oscillate about the axis of the commutator, variable-span pairs of positive and negative brushes, each pair having a member mounted on each carrier, a controlling-brush in advance of each advance member of each variable-span pair of brushes, a controlling-brush in the rear of each lagging member of each variable-span pair of brushes, a solenoid having cumulatively acting coils connected on one side with the controlling-brushes associated with the advance members of each variable-span pair of brushes and on the other side with the circuit of the rectified current, a solenoid having cumulatively acting coils connected on one side with the controlling-brushes associated with the lagging members of the variable-span pairs of brushes and on the other side with the circuit of the rectified current, and carrier-actuating mechanism controlled by said solenoids.

11. In a device for rectifying single phase alternating current, the combination of a driven shaft equipped with rings, an alternating circuit having brushes engaging said rings, a commutator having spaced conducting segments so connected with said rings as to be energized first positively and then negatively, a plurality of oscillating carriers, variable-span pairs of positive and negative brushes engaging said commutator, each pair having a member mounted on each carrier, an auxiliary controller brush corresponding with each member of each variable-span pair of brushes, and electro magnetic carrier-actuating devices having circuits adapted to be closed through the medium of said auxiliary controller brushes.

12. In a device for rectifying single phase alternating current, the combination of a driven shaft equipped with rings, an alternating circuit having brushes engaging said rings, a commutator having spaced conducting segments so connected with said rings as to be energized first positively and then negatively, a plurality of oscillating carriers, variable-span pairs of positive and negative brushes engaging said commutator, each pair having a member mounted on each carrier, an auxiliary controller brush mounted on each of said carriers corresponding with each member of each variable-span pair of brushes, and electro magnetic carrier-actuating devices having circuits adapted to be closed through the medium of said auxiliary controller brushes.

RUSSELL T. WALKER.